US010746406B2

(12) United States Patent
Smith et al.

(10) Patent No.: US 10,746,406 B2
(45) Date of Patent: Aug. 18, 2020

(54) BREAKER BOX ASSEMBLY

(71) Applicant: Georg Fischer Central Plastics LLC, Shawnee, OK (US)

(72) Inventors: Michael D. Smith, Shawnee, OK (US); Thomas G. Veeley, Shawnee, OK (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 79 days.

(21) Appl. No.: 16/134,118

(22) Filed: Sep. 18, 2018

(65) Prior Publication Data

US 2020/0088407 A1     Mar. 19, 2020

(51) Int. Cl.
*G05D 7/01*     (2006.01)
*F23N 5/24*     (2006.01)

(52) U.S. Cl.
CPC .............. *F23N 5/245* (2013.01); *G05D 7/01* (2013.01)

(58) Field of Classification Search
None
See application file for complete search history.

(56) References Cited

U.S. PATENT DOCUMENTS

| 804,033 | A | * | 11/1905 | Pederson | F16N 7/30 |
|---|---|---|---|---|---|
| | | | | | 184/50.1 |
| 1,659,126 | A | | 2/1928 | Atta | |
| 3,296,859 | A | | 1/1967 | Stewart | |
| 3,386,473 | A | | 6/1968 | Driscoll | |
| 3,407,827 | A | * | 10/1968 | Follett | F16K 31/08 |
| | | | | | 137/39 |
| 3,788,344 | A | * | 1/1974 | Dyck | F16K 27/003 |
| | | | | | 137/271 |
| 4,609,074 | A | * | 9/1986 | Berrend | F16N 7/10 |
| | | | | | 137/883 |
| 4,665,941 | A | | 5/1987 | Hudson | |
| 5,785,086 | A | | 7/1998 | Boyce et al. | |
| 5,803,123 | A | | 9/1998 | Bell et al. | |
| 5,836,340 | A | | 11/1998 | Daghe et al. | |
| 5,861,556 | A | | 1/1999 | Nukui et al. | |
| 5,918,624 | A | | 7/1999 | Young | |
| 5,971,003 | A | | 10/1999 | Lyall et al. | |
| 7,034,704 | B2 | | 4/2006 | Mahowald | |
| 7,328,721 | B2 | | 2/2008 | Kytola | |
| 8,839,815 | B2 | | 9/2014 | Young et al. | |
| 9,074,770 | B2 | | 7/2015 | Young et al. | |
| 9,212,752 | B2 | | 12/2015 | Gardner | |
| 9,421,559 | B2 | * | 8/2016 | Cornett | B05B 1/202 |

(Continued)

FOREIGN PATENT DOCUMENTS

CA     2591489 A1     12/2007
CN     105333312 B     3/2018

(Continued)

*Primary Examiner* — John Fox
(74) *Attorney, Agent, or Firm* — Harness, Dickey & Pierce, P.L.C.

(57) ABSTRACT

The breaker box assembly may include a plurality of breaker modules that are removably attached to each other. Each breaker module includes a body and a first valve assembly disposed within the body. The body includes an inlet and first and second outlets. The first valve assembly is movable between a first position in which fluid is allowed to flow to the first and second outlets and a second position in which fluid is prevented from flowing to the first outlet and is permitted to flow to the second outlet.

18 Claims, 5 Drawing Sheets

(56) References Cited

U.S. PATENT DOCUMENTS

| | | | |
|---|---|---|---|
| 9,557,059 B2 | 1/2017 | Kucera et al. | |
| 10,247,594 B2 | 4/2019 | Smith et al. | |
| 2005/0171645 A1 | 8/2005 | Oswald et al. | |
| 2007/0089791 A1 | 4/2007 | Gohde et al. | |
| 2015/0114490 A1* | 4/2015 | Carpenter | E03B 7/072 |
| | | | 137/460 |
| 2017/0145668 A1 | 5/2017 | Salser et al. | |

FOREIGN PATENT DOCUMENTS

| | | |
|---|---|---|
| EP | 686833 B1 | 8/2001 |
| EP | 2093545 A1 | 8/2009 |
| EP | 2098833 A1 | 9/2009 |
| EP | 2383513 A1 | 11/2011 |
| EP | 1290412 B1 | 1/2012 |
| EP | 2763227 A1 | 8/2014 |
| EP | 1941246 B1 | 9/2014 |
| EP | 2840364 A1 | 2/2015 |
| EP | 2869036 A1 | 5/2015 |
| EP | 2869038 A1 | 5/2015 |
| EP | 2781892 A4 | 8/2015 |
| JP | H11287676 A | 10/1999 |
| JP | 2000146662 A | 5/2000 |
| JP | 2000249619 A | 9/2000 |
| JP | 3451078 B2 | 9/2003 |
| JP | 2004185917 A | 7/2004 |
| JP | 2005346986 A | 12/2005 |
| JP | 2006053073 A | 2/2006 |
| JP | 3982946 B2 | 9/2007 |
| JP | 2007292393 A | 11/2007 |
| JP | 2009168651 A | 7/2009 |
| JP | 2009245132 A | 10/2009 |
| JP | 2019032205 A | 2/2019 |
| RU | 2130591 C1 | 5/1999 |
| WO | WO-1997014945 A1 | 4/1997 |
| WO | WO-2011067923 A1 | 6/2011 |

* cited by examiner

BREAKER BOX ASSEMBLY

FIELD

The present disclosure relates to a breaker box assembly.

BACKGROUND

This section provides background information related to the present disclosure and is not necessarily prior art.

Buildings (e.g., houses, commercial property, etc.) include a gas piping system having a main gas line and supply lines disposed therein. The main gas line is in fluid communication with a fluid source (such as natural gas) outside of the home. The supply lines are connected to the main gas line at one end (via a coupling) and to a respective appliance (e.g., furnace, gas stove, etc.) at another end such that fluid may flow through the main gas line and the secondary gas lines and to the respective appliance, thereby permitting operation of the respective appliance. In the event of a leak or break in the main gas line or any one of the supply lines, fluid flowing to the entire gas piping system is shut-off via a valve until the leak is detected and serviced. This prevents operation of all appliances until the leak is detected and serviced since the supply lines are all connected in series either directly or indirectly to the main gas line.

The present disclosure provides a breaker box assembly that includes a plurality of breaker modules that are separately in fluid communication with an appliance via its own respective pipe (or conduit). In this way, any leak or break in one pipe prevents fluid from flowing through that pipe and to the appliance coupled thereto, while allowing the remaining appliances associated with the home to continue operating. Furthermore, the breaker box assembly of the present disclosure facilitates detection and servicing of the pipe containing the leak or break therein.

SUMMARY

This section provides a general summary of the disclosure, and is not a comprehensive disclosure of its full scope or all of its features.

In one form, the present disclosure provides a breaker box assembly. The breaker box assembly includes a plurality of breaker modules that are removably attached to each other. Each breaker module includes a body and a first valve assembly disposed within the body. The body includes an inlet and first and second outlets. The first valve assembly is movable between a first position in which fluid is allowed to flow to the first and second outlets and a second position in which fluid is prevented from flowing to the first outlet and is permitted to flow to the second outlet.

In some configurations of the breaker box assembly of the above paragraph, the first valve assembly moves from the first position to the second portion when a pressure difference between a first region upstream of the first valve assembly and a second region downstream of the first valve assembly exceeds a predetermined value.

In some configurations of the breaker box assembly of any one or more of the above paragraphs, the predetermined value is different for each breaker module.

In some configurations of the breaker box assembly of any one or more of the above paragraphs, the first outlet is in fluid communication with a respective appliance.

In some configurations of the breaker box assembly of any one or more of the above paragraphs, the second outlet is in fluid communication the inlet of an adjacent breaker module.

In some configurations of the breaker box assembly of any one or more of the above paragraphs, each breaker module includes a pipe assembly in fluid communication with the first outlet and disposed upstream of the respective appliance.

In some configurations of the breaker box assembly of any one or more of the above paragraphs, the pipe assembly includes a second valve assembly that is movable independently of the first valve assembly between a first position in which fluid flowing through the first outlet is prevented from flowing through the pipe assembly and a second position in which fluid flowing through the first outlet is permitted to flow through the pipe assembly.

In some configurations of the breaker box assembly of any one or more of the above paragraphs, the body of each breaker module has an indicia that indicates when the first valve assembly moves from the first position to the second position.

In some configurations of the breaker box assembly of any one or more of the above paragraphs, an inlet portion of the body of each breaker module includes a groove formed therein. A sealing member is disposed within the groove.

In some configurations of the breaker box assembly of any one or more of the above paragraphs, the fluid is natural gas.

In another form, the present disclosure provides a breaker box assembly. The breaker box assembly includes a plurality of breaker modules that are in fluid communication with each other. Each breaker module includes a body and a first valve assembly disposed within the body. The body includes an inlet and first and second outlets. The first valve assembly is movable between a first position in which fluid is allowed to flow to the first and second outlets and a second position in which fluid is prevented from flowing to the first outlet and is permitted to flow to the second outlet.

In some configurations of the breaker box assembly of the above paragraph, the first valve assembly moves from the first position to the second portion when a pressure difference between a first region upstream of the first valve assembly and a second region downstream of the first valve assembly exceeds a predetermined value.

In some configurations of the breaker box assembly of any one or more of the above paragraphs, the predetermined value is different for each breaker module.

In some configurations of the breaker box assembly of any one or more of the above paragraphs, the first outlet is in fluid communication with a respective appliance.

In some configurations of the breaker box assembly of any one or more of the above paragraphs, the plurality of breaker modules are removably attached to each other.

In some configurations of the breaker box assembly of any one or more of the above paragraphs, each breaker module includes a pipe assembly in fluid communication with the first outlet and disposed upstream of the respective appliance.

In some configurations of the breaker box assembly of any one or more of the above paragraphs, the pipe assembly includes a second valve assembly that is movable independently of the first valve assembly between a first position in which fluid flowing through the first outlet is prevented from flowing through the pipe assembly and a second position in which fluid flowing through the first outlet is permitted to flow through the pipe assembly.

In some configurations of the breaker box assembly of any one or more of the above paragraphs, the first valve assembly includes a valve body and a valve stem. The valve stem extends through the body of the breaker module.

In some configurations of the breaker box assembly of any one or more of the above paragraphs, an inlet portion of the body of each breaker module includes a groove formed therein, and wherein a sealing member is disposed within the groove.

In some configurations of the breaker box assembly of any one or more of the above paragraphs, the fluid is natural gas.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
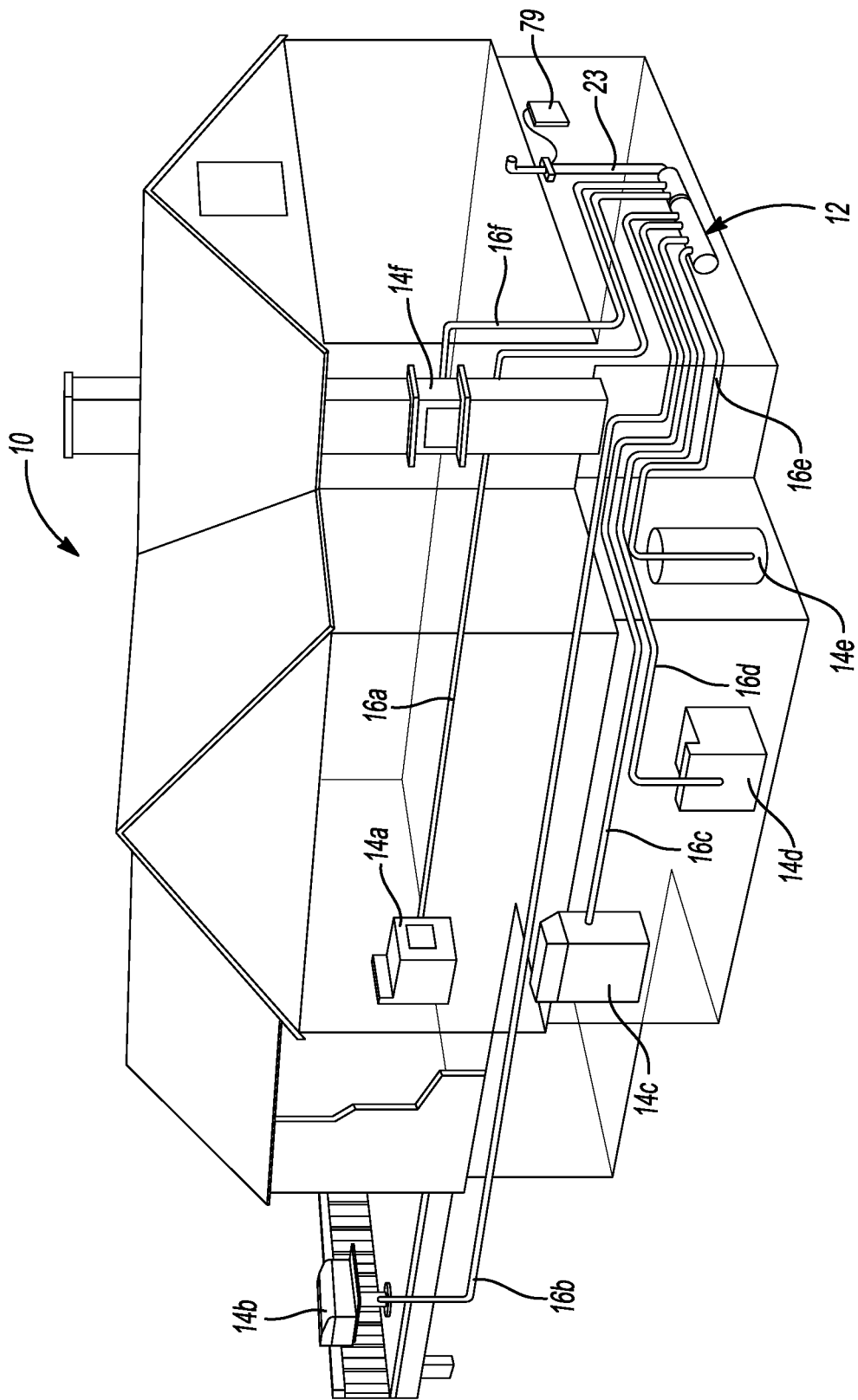
FIG. 1 is a perspective view of a housing having a breaker box assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a building 10 (e.g., a house) having a breaker box assembly 12 is provided. A plurality of gas appliances 14 (comprising a range 14a, a grill 14b, a furnace 14c, a dryer 14d, a water heater 14e and a fireplace 14f) are disposed within the building 10 and are fluidly coupled to the breaker box assembly 12 via conduits 16 (such as conduits 16a, 16b, 16c, 16d, 16e, 16f). That is, the range 14a, the grill 14b and the fireplace 14f may be disposed on a main level of the building 10 (above the ground surface) and the furnace 14c, the dryer 14d and the water heater 14e may be disposed below the main level of the building 10 (below the ground surface). In some configurations, the range 14a, the grill 14b and the fireplace 14f may be disposed below a main level of the building 10 (below the ground surface) and the furnace 14c, the dryer 14d and the water heater 14e may be disposed above the main level of the building 10 (above the ground surface). The breaker box assembly 12 provides fuel (i.e., a fluid such as natural gas) to the gas appliances 14, thereby permitting operation of the gas appliances 14.

With reference to FIGS. 1-4, the breaker box assembly 12 is disposed within the building 10 (FIG. 1) and includes a plurality of breaker modules 18 (such as breaker modules 18a, 18b, 18c, 18d, 18e, 18f), a distribution module 20, a cover module 22 and a pipe 23. The plurality of breaker modules 18 are removably attached to each other via fasteners 19 and are in fluid communication with each other. The plurality of breaker modules 18 are also in fluid communication with the distribution module 20. The breaker module 18a is removably attached to the distribution module 20 via fasteners 21a and the breaker module 18f is removably attached to the cover module 22 via fasteners 21b.

Figure 2:
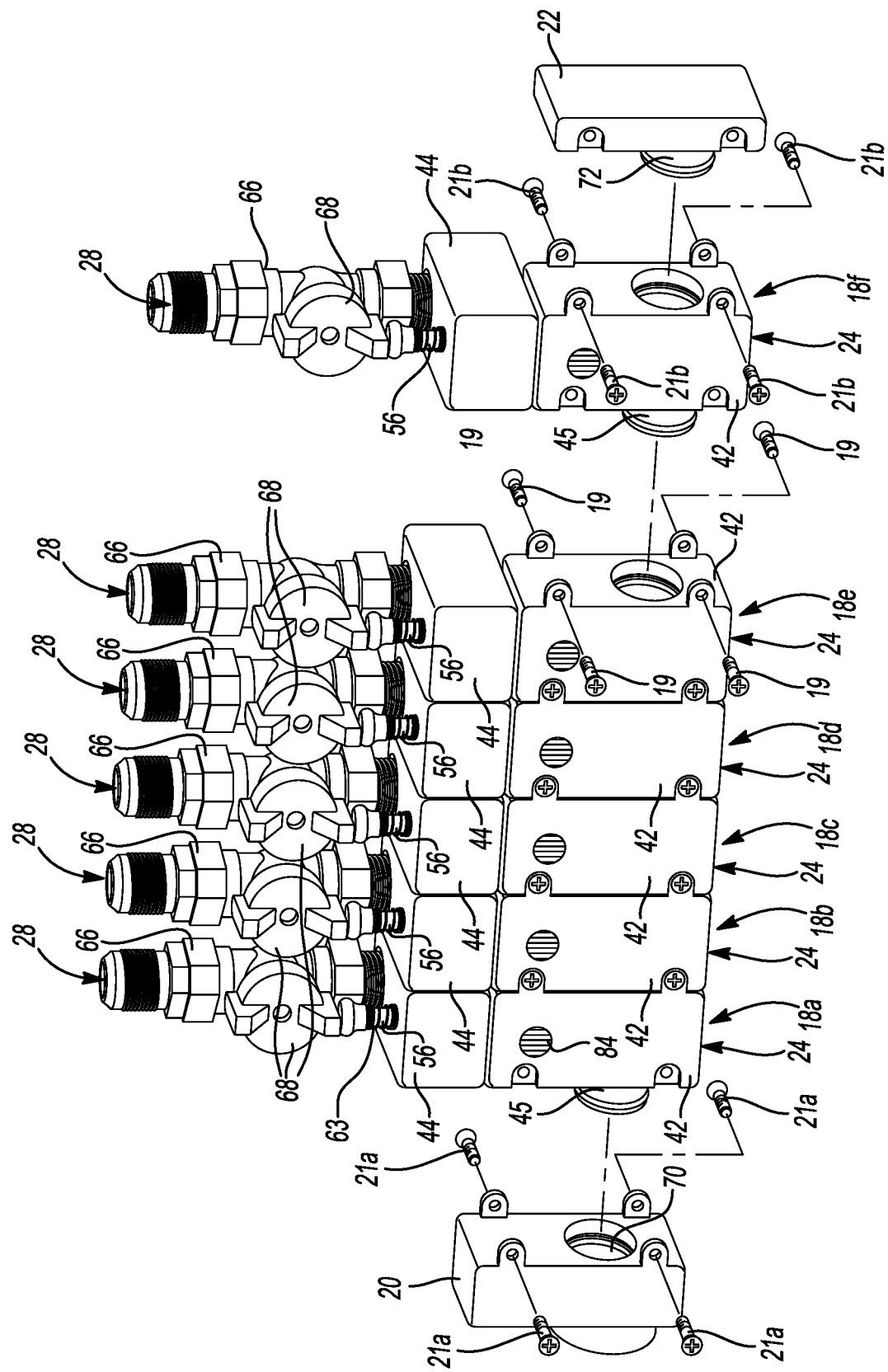
FIG. 2 is a perspective view of the breaker box assembly with one of the breaker modules detached.
Figure 3:
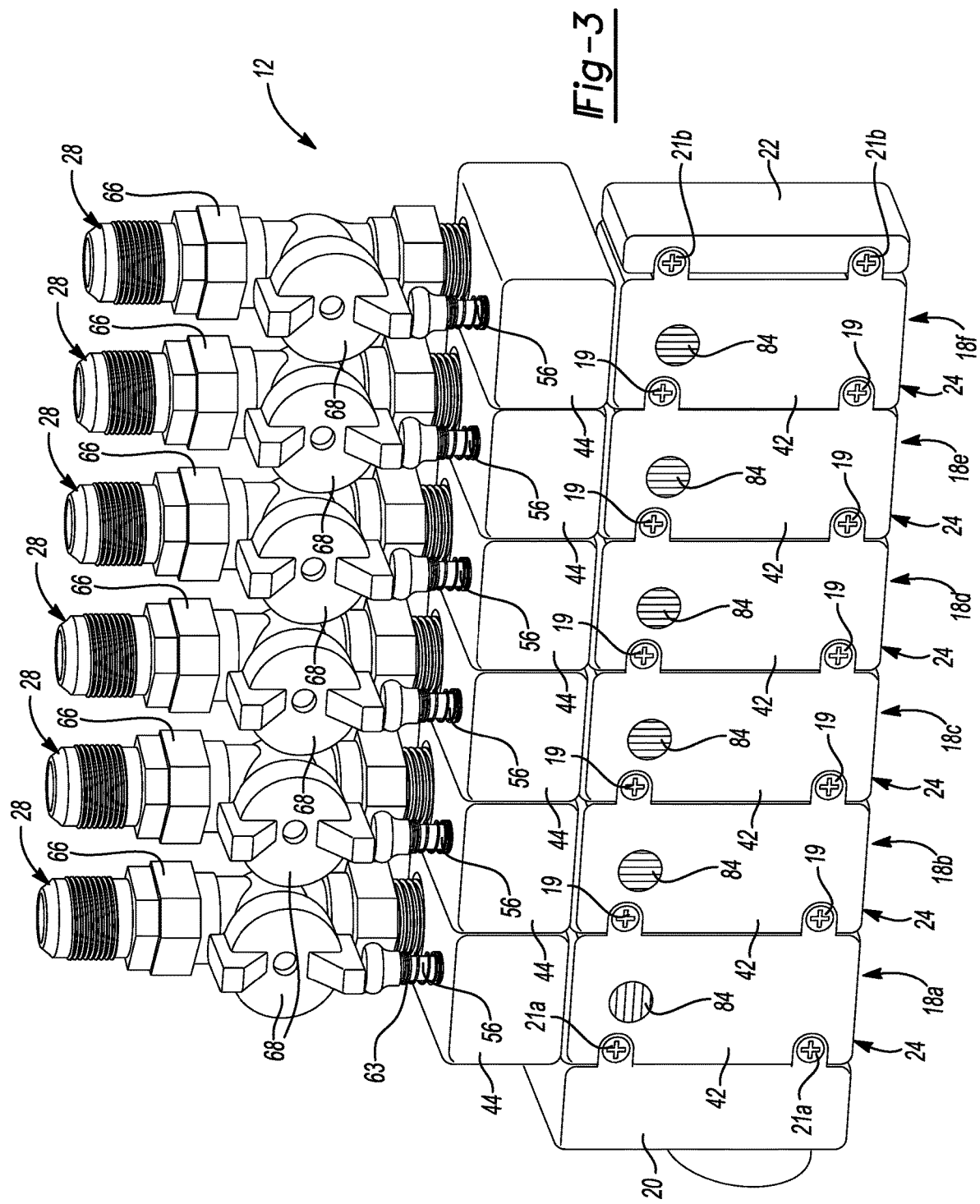
FIG. 3 is a perspective view of the breaker box as assembled.
Figure 4:
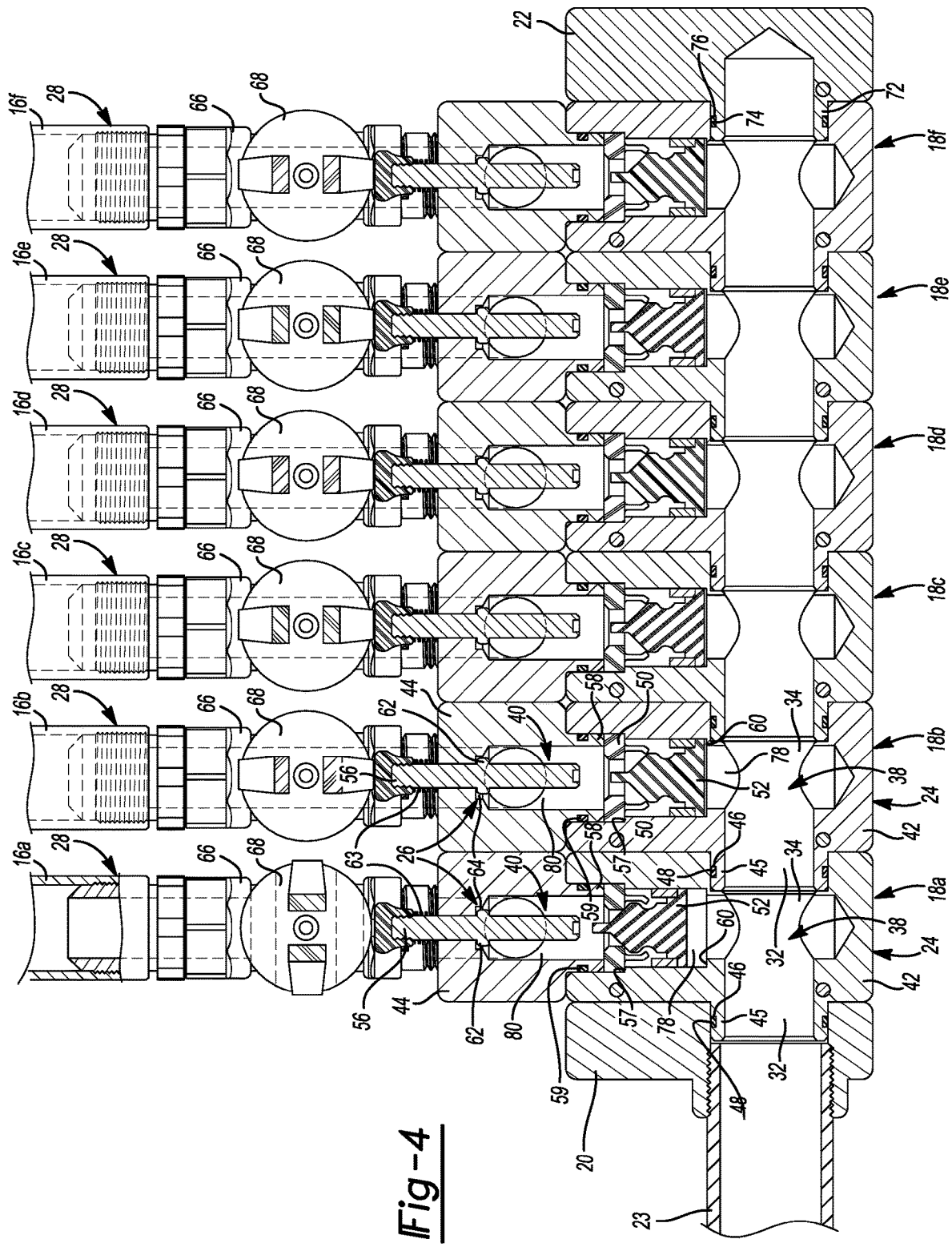
FIG. 4 is a cross-sectional view of the breaker box of FIG. 3.

As shown in FIGS. 2-4, each breaker module 18 includes a body 24, a valve assembly 26 and a pipe assembly 28. The body 24 may be made of a metallic material, for example, and may define an inlet 32, first and second outlets 34, 36, and first and second passageways 38, 40. The inlet 32 is in fluid communication with the first outlet 34 of a respective breaker module 18. The inlet 32 of the breaker module 18a is in fluid communication with the gas source (not shown) via the pipe 23 and the distribution module 20. The second outlet 36 is in fluid communication with a respective appliance 14a, 14b, 14c, 14d, 14e, 14f via the pipe assembly 28 and a respective conduit 16a, 16b, 16c, 16d, 16e, 16f. The first passageway 38 extends between the inlet 32 and the first outlet 34. The second passageway 40 extends perpendicular to the first passageway 38. The second passageway 40 is also in fluid communication with the first passageway 38 and the second outlet 36.

As shown in FIGS. 2-4, the body 24 also includes a first member 42 and a second member 44 that are attached to each other. An inlet portion 45 of the first member 42 is circular-shaped and includes a groove 46 extending 360 degrees around the inlet portion 45. The groove 46 receives a sealing member 48 (e.g., O-ring) such that fluid flowing through the first member 42 does not escape (i.e., leak out). The first member 42 of the body 24 defines the inlet 32, the first outlet 34 and the first passageway 38. The second member 44 defines the second outlet 36. The first and second members 30, 32 cooperate to define the second passageway 40.

As shown in FIG. 4, the valve assembly 26 is disposed within the body 24 of the breaker module 18 and includes a valve ring 50, a valve body 52 and a valve stem 56. The valve ring 50 is securely disposed within the second passageway 40 on a first seat 57 of the first member 42 and between the first seat 57 of the first member 42 and an end portion 58 of the second member 44. The end portion 58 has a sealing member 59 (e.g., O-ring) disposed within a groove formed therein. The valve body 52 is disposed within the second passageway 40 and is movably attached to the valve ring 50 between a first position in which fluid is allowed to flow to the first and second outlets 34, 36 and a second position in which fluid is permitted to flow to the first outlet 34 and prevented from flowing to the second outlet 36. When the valve body 52 is in the first position, fluid is allowed to flow through apertures (not shown) formed in the valve body 52 in route to the second outlet 36. When the valve body 52 is in the second position, it sealingly abuts against the valve ring 50 (see module 18a of FIG. 4) such that fluid is not allowed to flow through the second passageway 40 and the second outlet 36. The valve body 52 is disposed on a second seat 60 of the first member 42 when in the first position and removed from the second seat 60 when in the second position.

Figure 5:
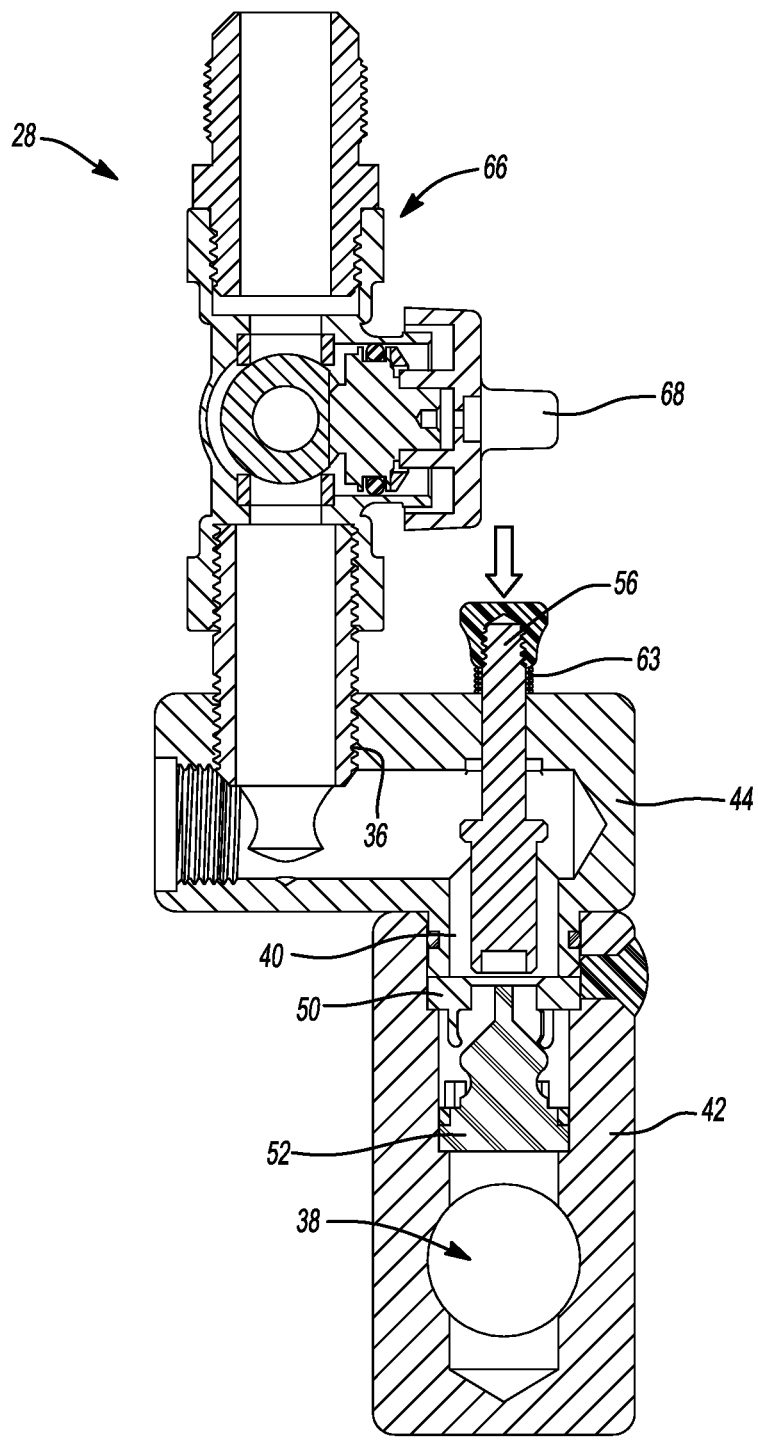
FIG. 5 is a cross-sectional view of one of the breaker modules of the breaker box.

As shown in FIG. 4, the elongated valve stem 56 extends through the second member 44 of the body 24 such that a portion thereof is disposed above the second member 44. The valve stem 56 is moveable between a first position (FIGS. 2-4) and a second position (FIG. 5). A biasing member 63 biases the valve stem 56 toward the first position. The valve stem 56 also includes a rib 62 extending outwardly from a middle portion thereof. The rib 62 is received in a groove 64 within the second member 44 and abuts against the second member 44 when the valve stem 56 is in the first position to prevent removal of the valve stem 56 from within the body 24.

The pipe assembly 28 is attached to the second member 44 of the body 24 at one end and the respective conduit 16a, 16b, 16c, 16d, 16e, 16f at another end such that fluid flowing through the second outlet 36 flows through the pipe assembly 28 and the respective conduit 16a, 16b, 16c, 16d, 16e, 16f and to the respective appliance 14a, 14b, 14c, 14d, 14e, 14f. The pipe assembly 28 includes a conduit 66 and a valve assembly 68. The conduit 66 is attached (e.g., integrally attached, threadably attached, etc.) to the second member 44 of the body 24 such that the second outlet 36 and the conduit 66 are in fluid communication with each other. The conduit 66 is also attached (e.g., integrally attached, threadably attached, etc.) to the respective conduit 16a, 16b, 16c, 16d, 16e, 16f such that the conduit 66 and the respective conduit 16a, 16b, 16c, 16d, 16e, 16f are in fluid communication with each other. The valve assembly 68 is operable between a first position (see module 18a of FIG. 4) in which fluid flowing through the second outlet 36 is prevented from flowing through the conduit 66 and a second position in which fluid flowing through the second outlet 36 is permitted to flow through the conduit 66. The valve assembly 68 is operable independently of the valve assembly 26 (i.e., the valve assembly 68 is movable between the first position and the second position regardless of the position of the valve assembly 26). In some configurations, the valve assemblies 26, 68 may be dependent on each other. That is, when the valve body 52 is moves to the second position then the valve stem 56, for example, may move the valve assembly 68 to the second position.

The distribution module 20 is removably attached to the breaker module 18a and threadably attached to the pipe 23 such that fluid flowing through the pipe 23 is allowed to flow through the distribution module 20 and into the breaker box assembly 12. The distribution module 20 includes an aperture 70 that has a threaded portion and an unthreaded portion. As shown in FIG. 4, the pipe 23 is attached to the distribution module 20 via the threaded portion and the breaker module 18a is attached to the distribution module 20 via the unthreaded portion.

The cover module 22 is removably attached to the breaker module 18f. An inlet portion 72 of the cover module 22 is circular-shaped and includes a groove 74 extending 360 degrees around the inlet portion 72. The groove 74 receives a sealing member 76 (e.g., O-ring) such that fluid flowing through the first outlet 34 of the breaker module 18f does not escape (i.e., leak out). It should be understood that the cover module 22 may be removed from the breaker module 18f and may be replaced with an additional breaker module (the additional breaker module may provide fluid to another appliance that is associated with the building 10). The pipe 23 is threadably attached to the distribution module 20 at one end and receives fluid (e.g., natural gas) from a fluid source at another end. An electrical panel 79 is in communication with the pipe 23.

With reference to FIGS. 1-4, operation of the breaker box assembly 12 will be described in more detail. During normal operation of the breaker box assembly 12, fluid is permitted to flow through the breaker modules 18 and to the appliances 14 via the conduits 16. In the event that a break or leak occurs downstream of any particular breaker module 18a, 18b, 18c, 18d, 18e 18f and causes a pressure difference between a first region 78 upstream of the valve body 52 and a second region 80 downstream of the valve body 52 to exceed a predetermined value, the valve body 52 of that particular breaker module 18a, 18b, 18c, 18d, 18e, 18f moves from the first position to the second position (as shown in the breaker module 18a of FIG. 4). This causes the valve body 52 to sealingly abut against the valve ring 50. In this way, fluid (e.g., natural gas) is prevented from flowing through that particular breaker module 18a and escaping into or out of the building 10 while the other breaker modules 18b, 18c, 18d, 18e, 18f are allowed to provide fluid to the respective appliance 14b, 14c, 14d, 14e, 14f. Stated another way, fluid flow is prevented through the second outlet 36 of the breaker module 18a with the break or leak while fluid flow is permitted through the second outlet 36 of the other breaker modules 18b, 18c, 18d, 18e, 18f without the break or leak. It should be understood that the pressure difference needed to move the valve body 52 may be different for each breaker module 18a, 18b, 18c, 18d, 18e, 18f (i.e., the predetermined value is different for each breaker module 18a, 18b, 18c, 18d, 18e, 18f).

Each breaker module 18a, 18b, 18c, 18d, 18e 18f may include indicia 84 on the body 24 thereof, which indicates that fluid flow through that breaker module has been stopped. Such indicia 84 may be lines that change from vertical to horizontal when fluid flow through the breaker module has been stopped (see breaker module 18a in FIG. 3). In some configurations, the indicia may be a light that goes from green (indicating normal operating condition) to red (indicating a break or a leak) when the valve body 52 moves from the first position to the second position. In this way, a service technician (not shown) may easily identify which conduit 16a, 16b, 16c, 16d, 16e, 16f and/or appliance 14a, 14b, 14c, 14d, 14e, 14f needs servicing. Once the service technician services the conduit 16a, 16b, 16c, 16d, 16e, 16f and/or the appliance 14a, 14b, 14c, 14d, 14e, 14f, the service technician may push down on the valve stem 56 of the serviced breaker module 18a, 18b, 18c, 18d, 18e 18f, thereby resetting the valve assembly 26 and the indicia 84. It should be noted that the valve assembly 68 is in the first position prior to the service technician pushing down on the valve stem 56 to reset the valve body 52.

In some configurations, sensors (not shown) may be in communication with the electrical panel 79 and may be disposed at various locations of the conduits 16 and the appliances 14. The sensors may detect leaks in the conduits 16 and/or the appliances 14 that are below the pressures required to move the valve body 52 from the first position to the second position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A breaker box assembly comprising:
   a plurality of breaker modules removably attached to each other, each breaker module including a body and a first valve assembly disposed within the body, the body including an inlet and first and second outlets, the first valve assembly movable between a first position in which fluid is allowed to flow to the first and second outlets and a second position in which fluid is prevented from flowing to the first outlet and is permitted to flow to the second outlet, and
   wherein each breaker module includes a pipe assembly in fluid communication with the first outlet and including a second valve assembly that is movable independently of the first valve assembly between a first position in which fluid flowing through the first outlet is prevented from flowing through the pipe assembly and a second position in which fluid flowing through the first out is permitted to flow through the pipe assembly.

2. The breaker box assembly of claim 1, wherein the first valve assembly moves from the first position to the second position when a pressure difference between a first region upstream of the first valve assembly and a second region downstream of the first valve assembly exceeds a predetermined value.

3. The breaker box assembly of claim 2, wherein the predetermined value is different for each breaker module.

4. The breaker box assembly of claim 2, wherein the first outlet is in fluid communication with a respective appliance.

5. The breaker box assembly of claim 4, wherein the second outlet is in fluid communication the inlet of a respective breaker module.

6. The breaker box assembly of claim 5, wherein the pipe assembly is disposed upstream of the respective appliance.

7. The breaker box assembly of claim 1, wherein the body of each breaker module has indicia that indicates when the first valve assembly moves from the first position to the second position.

8. The breaker box assembly of claim 1, wherein an inlet portion of the body of each breaker module includes a groove formed therein, and wherein a sealing member is disposed within the groove.

9. The breaker box assembly of claim 1, wherein the fluid is natural gas.

10. A breaker box assembly comprising:
    a plurality of breaker modules in fluid communication with each other, each breaker module including a body and a first valve assembly disposed within the body, the body including an inlet and first and second outlets, the first valve assembly movable between a first position in which fluid is allowed to flow to the first and second outlets and a second position in which fluid is prevented from flowing to the first outlet and is permitted to flow to the second outlet, and
    wherein each breaker module includes a pipe assembly in fluid communication with the first outlet and including a second valve assembly that is movable independently of the first valve assembly between a first position in which fluid flowing through the first outlet is prevented from flowing through the pipe assembly and a second position in which fluid flowing through the first out is permitted to flow through the pipe assembly.

11. The breaker box assembly of claim 10, wherein the first valve assembly moves from the first position to the second position when a pressure difference between a first region upstream of the first valve assembly and a second region downstream of the first valve assembly exceeds a predetermined value.

12. The breaker box assembly of claim 11, wherein the predetermined value is different for each breaker module.

13. The breaker box assembly of claim 11, wherein the first outlet is in fluid communication with a respective appliance.

14. The breaker box assembly of claim 13, wherein the plurality of breaker modules are removably attached to each other.

15. The breaker box assembly of claim 14, wherein the pipe assembly is disposed upstream of the respective appliance.

16. The breaker box assembly of claim 10, wherein the first valve assembly includes a valve body and a valve stem, and wherein the valve stem extends through the body of the breaker module.

17. The breaker box assembly of claim 10, wherein an inlet portion of the body of each breaker module includes a groove formed therein, and wherein a sealing member is disposed within the groove.

18. The breaker box assembly of claim 10, wherein the fluid is natural gas.

* * * * *